US011181194B2

(12) United States Patent
Matsuzaka et al.

(10) Patent No.: US 11,181,194 B2
(45) Date of Patent: Nov. 23, 2021

(54) FLUID PRESSURE DRIVE DEVICE

(71) Applicant: KYB Corporation, Tokyo (JP)

(72) Inventors: Keita Matsuzaka, Kanagawa (JP);
Kenji Suzuki, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 16/760,800

(22) PCT Filed: Sep. 12, 2019

(86) PCT No.: PCT/JP2019/035912
§ 371 (c)(1),
(2) Date: Apr. 30, 2020

(87) PCT Pub. No.: WO2020/110426
PCT Pub. Date: Jun. 4, 2020

(65) Prior Publication Data
US 2021/0222711 A1    Jul. 22, 2021

(30) Foreign Application Priority Data
Nov. 26, 2018 (JP) .............................. JP2018-220609

(51) Int. Cl.
*F16H 61/4104* (2010.01)
*F15B 21/0423* (2019.01)
*F15B 11/08* (2006.01)

(52) U.S. Cl.
CPC .......... *F16H 61/4104* (2013.01); *F15B 11/08* (2013.01); *F15B 21/0423* (2019.01)

(58) Field of Classification Search
CPC .................................................. F16H 61/4104
See application file for complete search history.

(56) References Cited

U.S. PATENT DOCUMENTS

| | | | | |
|---|---|---|---|---|
| 3,846,982 A | * | 11/1974 | Rometsch | F16H 61/4139 60/445 |
| 4,531,369 A | * | 7/1985 | Izumi | F16H 39/02 60/456 |
| 7,430,860 B2 | * | 10/2008 | Whitaker | F16H 61/40 60/464 |
| 8,132,588 B1 | * | 3/2012 | Langenfeld | F16K 11/065 137/112 |

(Continued)

FOREIGN PATENT DOCUMENTS

| | | | | |
|---|---|---|---|---|
| DE | 102010006464 A1 | * | 8/2011 | F16H 61/4104 |
| EP | 1443220 A1 | * | 8/2004 | F16H 61/4104 |

(Continued)

*Primary Examiner* — Michael Leslie
(74) *Attorney, Agent, or Firm* — Rabin & Berdo, P.C.

(57) ABSTRACT

A fluid pressure drive device includes a flushing circuit configured to discharge a working fluid from one of the pair of main passages to a tank. The flushing circuit has a low pressure selection valve provided between the pair of main passages and configured to be switched by a pressure difference between the pair of main passages, the low pressure selection valve being configured to select the main passage on the low pressure side; and a flushing passage configured to lead the working fluid passing through the low pressure selection valve to the tank. The flushing passage has a first orifice and a bent portion formed on the downstream side of the first orifice.

5 Claims, 9 Drawing Sheets

(56) References Cited

U.S. PATENT DOCUMENTS

| | | | |
|---|---|---|---|
| 10,119,557 B2 * | 11/2018 | Miyata | F16H 61/4104 |
| 10,167,882 B2 * | 1/2019 | Streblau | F16H 61/4104 |
| 10,808,838 B2 * | 10/2020 | Gepraegs | F16H 61/4104 |
| 10,982,761 B2 * | 4/2021 | Mitsui | F16H 61/4104 |
| 2013/0305702 A1 | 11/2013 | Essig | |
| 2014/0150880 A1 | 6/2014 | Rousseau et al. | |
| 2019/0376535 A1 | 12/2019 | Mitsui et al. | |

FOREIGN PATENT DOCUMENTS

| | | |
|---|---|---|
| JP | 2002-130474 A | 5/2002 |
| JP | 2002-227998 A | 8/2002 |
| JP | 2008101636 A | 5/2008 |
| JP | 2018123902 A | 8/2018 |
| KR | 1019830009398 A | 12/1983 |
| WO | 2018/143081 A1 | 8/2018 |

* cited by examiner

FLUID PRESSURE DRIVE DEVICE

TECHNICAL FIELD

The present invention relates to a fluid pressure drive device.

BACKGROUND ART

There is a hydraulic drive device configured to drive a hydraulic motor, including a flushing circuit for suppressing a temperature increase in working oil (see JP2002-227998A).

JP2002-227998A discloses a flushing circuit including a flushing valve connected to a pair of main pipe lines via a flushing line, and a relief valve whose primary side is connected to the discharge side of the flushing valve.

SUMMARY OF INVENTION

In the flushing circuit described in JP2002-227998A, the working oil is discharged from the main pipe line on the low pressure side through the relief valve. Thus, at the time of adjusting a cooling ability of the flushing circuit, there is a need for adjusting settings of the relief valve. Since the number of parts of the relief valve is large, much labor is required for adjustment of the cooling ability of the flushing circuit. When the working oil passes through the relief valve, due to generation of negative pressure on the downstream side of the relief valve, pulsation occurs in a flushing flow rate and vibration may occur in a pipe.

An object of the present invention is to provide a fluid pressure drive device in which a cooling ability of a flushing circuit can be easily adjusted and occurrence of pulsation of a flushing flow rate can be suppressed.

According to one aspect of the present invention, a fluid pressure drive device includes: a fluid pressure motor configured to be driven by a working fluid which is supplied from a fluid pressure pump; a pair of main passages connected to the fluid pressure motor, one of the main passages to which the working fluid supplied from the fluid pressure pump is led; and a flushing circuit configured to discharge the working fluid from one of the pair of main passages to a tank. The flushing circuit has: a low pressure selection valve provided between the pair of main passages and configured to be switched by a pressure difference between the pair of main passages, the low pressure selection valve being configured to select the main passage on the low pressure side; and a flushing passage configured to lead the working fluid passing through the low pressure selection valve to the tank. The flushing passage has a first orifice and a bent portion formed on the downstream side of the first orifice.

DESCRIPTION OF EMBODIMENTS

Hereinafter, with reference to the drawings, embodiments of the present invention will be described.

First Embodiment

Figure 1:
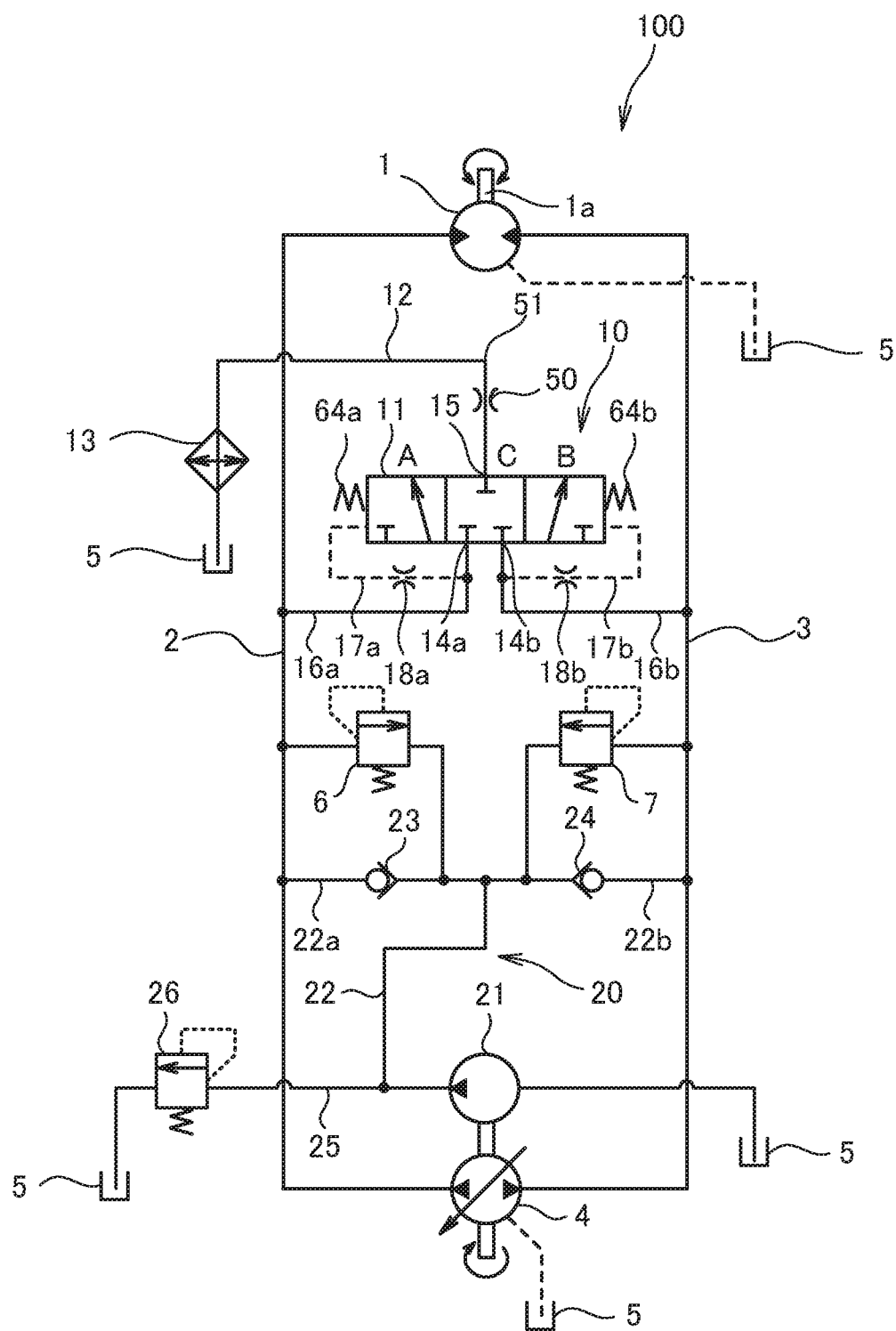
FIG. 1 is a fluid pressure circuit diagram of a fluid pressure drive device according to a first embodiment of the present invention.
Figure 2:
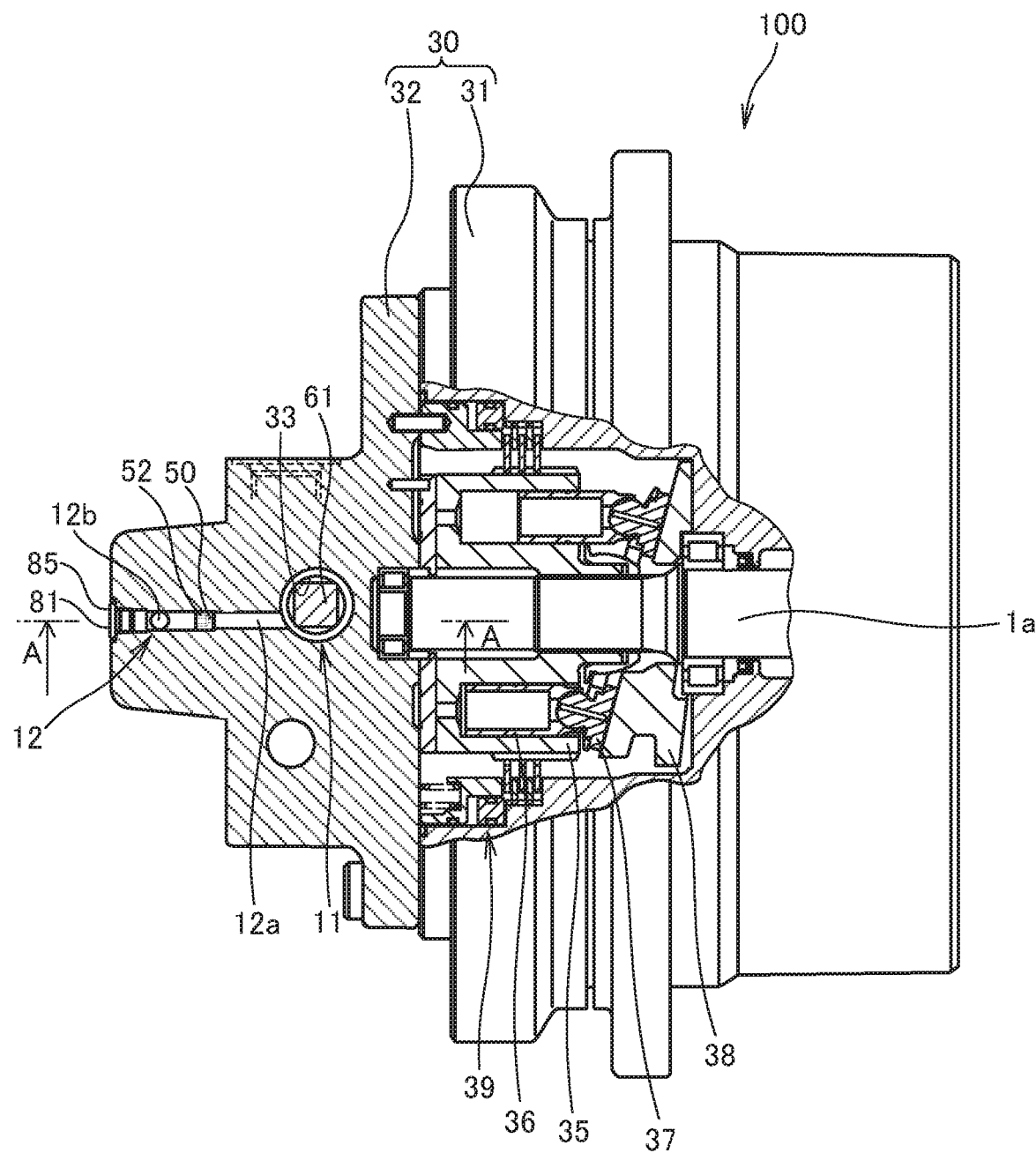
FIG. 2 is a sectional view of part of the fluid pressure drive device according to the first embodiment of the present invention.
Figure 3:
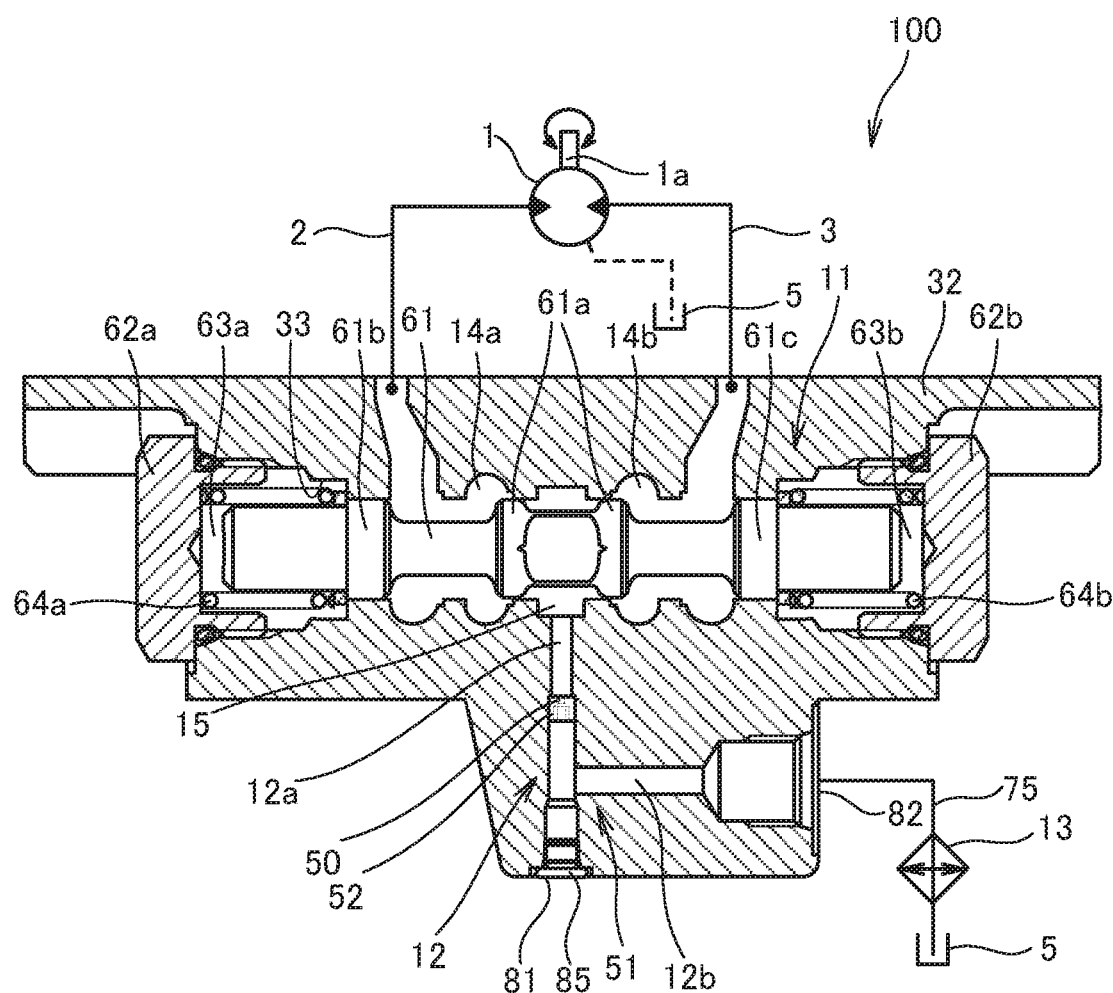
FIG. 3 is a sectional view taken along the line A-A of FIG. 2.

With reference to FIGS. 1 to 3, a fluid pressure drive device 100 according to a first embodiment of the present invention will be described.

The fluid pressure drive device 100 is a device for driving a hydraulic motor 1 (fluid pressure motor) whose output shaft 1a is coupled to an object to be driven (not shown) such as a working machine. In the fluid pressure drive device 100, working oil is used as a working fluid. In place of the working oil, another working fluid such as working water may be used.

As shown in FIG. 1, the fluid pressure drive device 100 includes the hydraulic motor 1 configured to be driven by the working oil supplied from a hydraulic pump (fluid pressure pump) 4, and first and second main passages 2 and 3 serving as a pair of main passages connected to the hydraulic motor 1. The hydraulic motor 1 is driven by the working oil supplied from the hydraulic pump 4 through one of the first and second main passages 2, 3.

The hydraulic pump 4 is driven by a drive source such as an engine or an electric motor. The hydraulic pump 4 is a variable displacement pump in which the discharging direction and a discharge flow rate are adjusted by controlling a swash plate angle by a regulator. The working oil discharged from the hydraulic pump 4 is supplied to the hydraulic motor 1 through one of the first and second main passages 2, 3, and the working oil discharged from the hydraulic motor 1 is returned to the suction side of the hydraulic pump 4 through the other of the first and second main passage 2, 3. In this way, a hydraulic circuit of the fluid pressure drive device 100 is formed as a closed circuit. In a case where the working oil discharged from the hydraulic pump 4 is supplied to the hydraulic motor 1 through the first main passage 2, the first main passage 2 has high pressure and the second main passage 3 has low pressure. Meanwhile, in a case where the working oil discharged from the hydraulic pump 4 is supplied to the hydraulic motor 1 through the second main passage 3, the second main passage 3 has high pressure and the first main passage 2 has low pressure.

The fluid pressure drive device 100 further includes a flushing circuit 10 configured to discharge the working oil from one of the first and second main passages 2, 3 to a tank 5, and a charging circuit 20 configured to supplement the working oil to the first and second main passages 2, 3.

The flushing circuit 10 discharges a fixed flow rate of the working oil in the circuit, and the charging circuit 20 supplements an amount of the working oil discharged by the flushing circuit 10 into the circuit. The working oil discharged to the tank 5 through the flushing circuit 10 is cooled by a cooler 13, and the charging circuit 20 supplements the cooled working oil into the circuit. In the closed circuit, since an amount of working oil circulated in the circuit is small, there is a tendency that a temperature of the working oil in the circuit is easily increased. However, by operations of the flushing circuit 10 and the charging circuit 20, a temperature increase in the working oil in the circuit is suppressed.

The flushing circuit 10 has a low pressure selection valve 11, a flushing passage 12, and the cooler 13. The low pressure selection valve 11 is provided between the first main passage 2 and the second main passage 3 and configured to be switched by a pressure difference between both the main passages 2, 3. The low pressure selection valve is configured to select the main passage on the low pressure side. The flushing passage 12 is configured to lead the working oil passing through the low pressure selection valve 11 to the tank 5. The cooler 13 is provided in the flushing passage 12 and configured to cool the passing working oil.

The low pressure selection valve 11 has three ports of a first inlet port 14a communicating with the first main passage 2 via a branch passage 16a, a second inlet port 14b communicating with the second main passage 3 via a branch passage 16b, and an outlet port 15 communicating with the flushing passage 12.

A pilot passage 17a is connected to the branch passage 16a, and a pilot passage 17b is connected to the branch passage 16b. Orifices 18a, 18b are respectively provided in the pilot passages 17a, 17b. The working oil from the first main passage 2 and the working oil from the second main passage 3 respectively act on both ends of a spool 61 (see FIGS. 2 and 3) of the low pressure selection valve 11 through the pilot passages 17a, 17b. Therefore, the spool 61 is moved by the pressure difference between the first main passage 2 and the second main passage 3, and a position of the low pressure selection valve 11 is switched.

Specifically, in a case where the first main passage 2 has high pressure, the second main passage 3 has low pressure, and the pressure difference between the first main passage 2 and the second main passage 3 is a predetermined value or more, the spool 61 is moved to the right side in the figure against biasing force of a spring 64b. Thereby, the low pressure selection valve 11 is set at a position A (left side in the figure), and the second inlet port 14b and the outlet port 15 communicate with each other, so that the working oil of the second main passage 3 on the low pressure side is led to the flushing passage 12.

Meanwhile, in a case where the first main passage 2 has low pressure, the second main passage 3 has high pressure, and the pressure difference between the first main passage 2 and the second main passage 3 is the predetermined value or more, the spool 61 is moved to the left side in the figure against biasing force of a spring 64a. The low pressure selection valve 11 is set at a position B (right side in the figure), and the first inlet port 14a and the outlet port 15 communicate with each other, so that the working oil of the first main passage 2 on the low pressure side is led to the flushing passage 12.

In a case where the pressure difference between the first main passage 2 and the second main passage 3 is less than the predetermined value, the low pressure selection valve 11 is set at a position C (center in the figure) by the biasing force of the springs 64a and 64b, and communication between the first inlet port 14a, the second inlet port 14b, and the outlet port 15 is shut off.

In this way, the low pressure selection valve 11 has the three positions and is switched by the pressure difference between the first main passage 2 and the second main passage 3.

The charging circuit 20 has a charging pump 21 configured to suck and discharge the working oil of the tank 5, and a charging passage 22 configured to lead the working oil discharged from the charging pump 21 to the first and second main passages 2, 3. The charging pump 21 is a fixed displacement hydraulic pump configured to be rotated coaxially with the hydraulic pump 4.

The charging passage 22 is divided into a first charging passage 22a and a second charging passage 22b in the middle, and the first and second charging passage 22a, 22b are respectively connected to the first and second main passages 2, 3. A check valve 23 configured to permit only a flow of the working oil from the charging pump 21 to the first main passage 2 is provided in the first charging passage 22a, and a check valve 24 configured to permit only a flow of the working oil from the charging pump 21 to the second main passage 3 is provided in the second charging passage 22b. The working oil discharged from the charging pump 21 is supplemented to the main passage on the low pressure side among the first and second main passages 2, 3 through the charging passage 22.

A relief passage 25 is connected to the charging passage 22 on the upstream side of the check valves 23, 24, and a relief valve 26 is provided in the relief passage 25. In this way, the extra working oil discharged from the charging pump 21 to the charging passage 22 is discharged to the tank 5. Thereby, at the time of driving the charging pump 21, the pressure of the first and second main passages 2, 3 is maintained to be valve opening pressure of the relief valve 26 or more.

The fluid pressure drive device 100 includes a pair of relief valves 6, 7 provided in the opposite directions to each other between the first main passage 2 and the second main passage 3. At the time of a relief action, the relief valves 6, 7 release the working oil from the main passage on the high pressure side among the first and second main passages 2, 3 to the main passage on the low pressure side through the charging passage 22.

Figure 4:
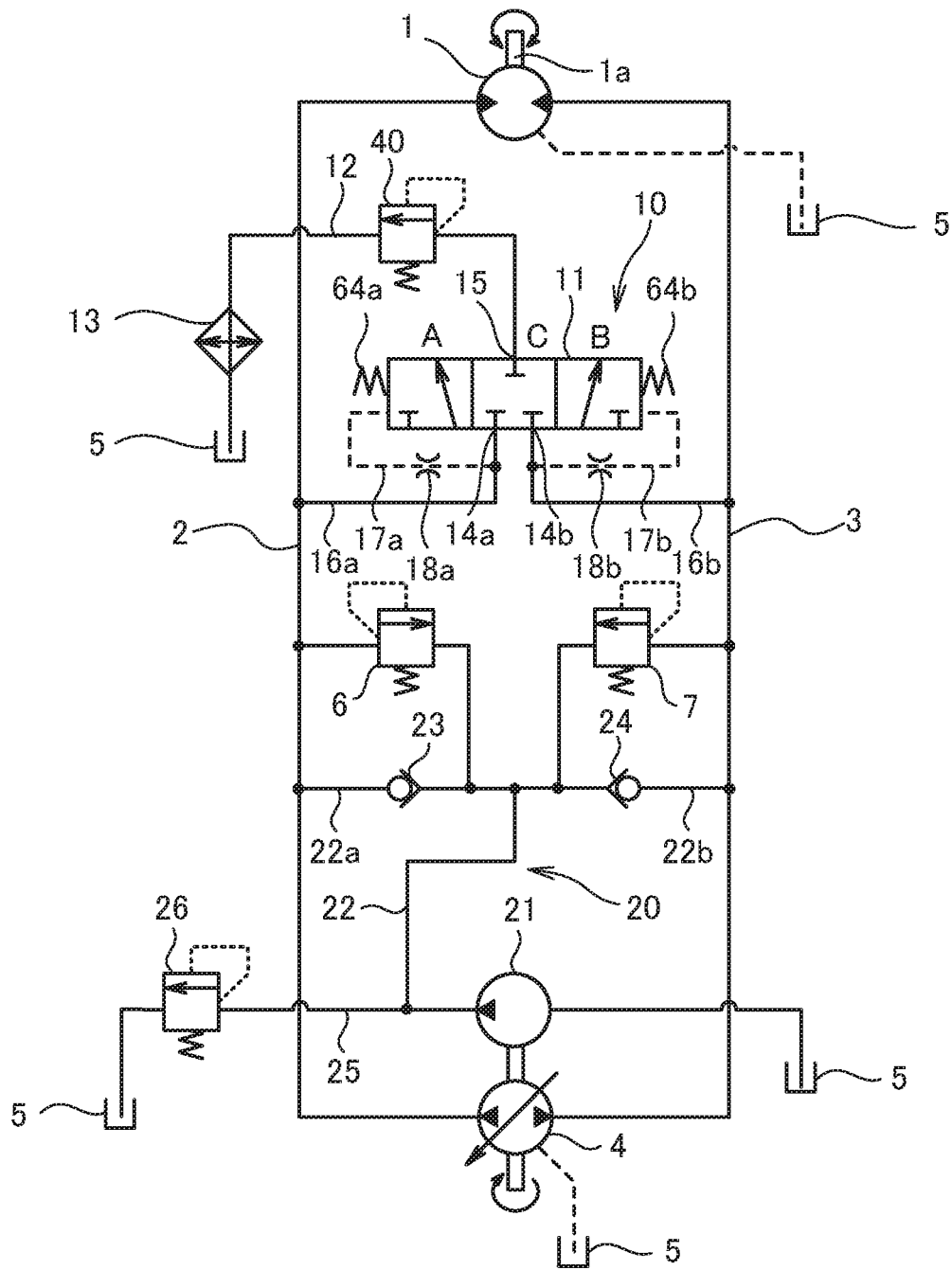
FIG. 4 is a fluid pressure circuit diagram of a comparative example.

With reference to FIG. 4, a comparative example will be described. In the comparative example, a relief valve 40 is provided in the flushing passage 12. At the time of adjusting a cooling ability by the flushing circuit 10, a flushing flow rate is adjusted by replacing the relief valve 40. Since the number of parts of the relief valve 40 is large, it takes time to adjust the flushing flow rate. Since processing of parts of the relief valve 40 is complicated, cost is high. The relief valve 40 is opened in a case where pressure of the flushing passage 12 reaches predetermined valve opening pressure set in advance. Thus, the relief valve 40 may not be opened depending on the pressure of the main passage on the low pressure side among the first and second main passages 2, 3, so that there is a problem that the flushing flow rate is not stabilized. In particular, in a case where the working oil of the main passage on the low pressure side among the first and second main passages 2, 3 is drawn out and utilized for driving another hydraulic device, the flushing flow rate becomes unstable, and the cooling ability by the flushing circuit 10 also becomes unstable. Further, when the working oil passes through the relief valve 40, due to generation of negative pressure on the downstream side of the relief valve 40, pulsation occurs in the flushing flow rate and vibration may occur in a pipe forming part of the flushing passage 12.

As a countermeasure against the above problems in the comparative example, in the present embodiment, as shown in FIG. 1, the flushing passage 12 has an orifice 50 (first orifice) for applying resistance to the working oil flowing through the flushing passage 12 to adjust the flushing flow rate, and a bent portion 51 formed on the downstream side of the orifice 50.

The orifice 50 is provided to be replaceable in the flushing passage 12. At the time of adjusting the cooling ability of the working oil by the flushing circuit 10, the flushing flow rate is adjusted only by replacing the orifice 50. Specifically, the flushing flow rate is adjusted only by replacing with an orifice 50 having an inner diameter corresponding to a required flushing flow rate. In this way, the number of parts of the orifice 50 is small and processing is easy. Thus, it is possible to easily adjust the flushing flow rate at low cost. Since the flow rate is determined by inlet pressure in the orifice 50, it is possible to ensure the fixed flushing flow rate in accordance with the pressure of the main passage on the low pressure side among the first and second main passages 2, 3. Therefore, it is possible to stabilize the cooling ability by the flushing circuit 10. Further, since there is the bent portion 51 on the downstream side of the orifice 50, a pressure decrease between the orifice 50 and the bent portion 51 is suppressed by a pressure loss in the bent portion 51, and it is possible to reduce the generation of the negative pressure on the downstream side of the orifice 50. Therefore, since it is possible to suppress occurrence of pulsation of the flushing flow rate flowing through the flushing passage 12, it is possible to prevent occurrence of vibration of a pipe 75 (see FIG. 3) forming part of the flushing passage 12.

Next, with reference to FIGS. 2 and 3, a structure of the fluid pressure drive device 100 will be described. FIG. 2 is a sectional view of part of the fluid pressure drive device 100, and FIG. 3 is a sectional view taken along the line A-A of FIG. 2.

The hydraulic motor 1 and the low pressure selection valve 11 are accommodated in a case 30. The case 30 has a main body portion 31, and a cover portion 32 sealing an opening portion of the main body portion 31. The output shaft 1a, a cylinder block 35, pistons 36, shoes 37, a swash plate 38, and a brake mechanism 39, etc., which form the hydraulic motor 1, are accommodated in an internal space of the main body portion 31. The low pressure selection valve 11 is accommodated in the cover portion 32.

Hereinafter, the low pressure selection valve 11 will be described.

An accommodation hole 33 into which the spool 61 is slidably inserted is formed in the cover portion 32. Also, a first flushing hole 12a and a second flushing hole 12b forming part of the flushing passage 12 are formed in the cover portion 32.

The first inlet port 14a communicating with the first main passage 2, the second inlet port 14b communicating with the second main passage 3, and the outlet port 15 communicating with the first flushing hole 12a are formed in an inner periphery of the accommodation hole 33. The communication and shut-off between the first inlet port 14a, the second inlet port 14b, and the outlet port 15 are switched by a first land portion 61a formed in a center portion of the spool 61.

Opening portions at both ends of the accommodation hole 33 are respectively sealed by plugs 62a, 62b. A pilot chamber 63a is partitioned by the plug 62a and a second land portion 61b formed on the one end side of the spool 61.

A pilot chamber 63b is partitioned by the plug 62b and a third land portion 61c formed on the other end side of the spool 61.

The working oil of the first main passage 2 is always led to the pilot chamber 63a through the pilot passage 17a (see FIG. 1), and the working oil of the second main passage 3 is always led to the pilot chamber 63b through the pilot passage 17b. Springs 64a, 64b configured to bias the spool 61 in the direction in which the volumes of the pilot chambers 63a, 63b are increased are respectively accommodated in the pilot chambers 63a, 63b.

In a case where the first main passage 2 has high pressure, the second main passage 3 has low pressure, and the pressure difference between the first main passage 2 and the second main passage 3 is the predetermined value or more, the spool 61 is moved in the direction in which the pilot chamber 63b is contracted against the biasing force of the spring 64b (to the right side in FIG. 3). Thereby, the second inlet port 14b and the outlet port 15 communicate with each other, so that the working oil of the second main passage 3 on the low pressure side is led to the flushing passage 12.

Meanwhile, in a case where the first main passage 2 has low pressure, the second main passage 3 has high pressure, and the pressure difference between the first main passage 2 and the second main passage 3 is the predetermined value or more, the spool 61 is moved in the direction in which the pilot chamber 63a is contracted against the biasing force of the spring 64a (to the left side in FIG. 3). Thereby, the first inlet port 14a and the outlet port 15 communicate with each other, so that the working oil of the first main passage 2 on the low pressure side is led to the flushing passage 12.

The first flushing hole 12a has an opening portion 81 on an outer surface of the cover portion 32 and is formed in a linear shape. The opening portion 81 of the first flushing hole 12a is closed by a plug 85 attached to the cover portion 32. The second flushing hole 12b has an opening portion 82 on the outer surface of the cover portion 32 and is formed in a linear shape. The pipe 75 communicating with the tank 5 is connected to the opening portion 82. The flushing passage 12 is formed by the first flushing hole 12a, the second flushing hole 12b, and the pipe 75.

The first flushing hole 12a and the second flushing hole 12b communicate with each other while being orthogonal to each other. A communication portion between the first flushing hole 12a and the second flushing hole 12b is the bent portion 51. A crossing angle between the first flushing hole 12a and the second flushing hole 12b, that is, a bent angle of the bent portion 51 is not limited to 90 degrees but may be less than 90 degrees or may be more than 90 degrees.

The orifice 50 is provided in the first flushing hole 12a. Specifically, the orifice 50 is formed in an orifice plug 52 screwed and fixed to an inner periphery of the first flushing hole 12a.

Since the bent portion 51 is formed on the downstream side of the orifice 50, the generation of the negative pressure between the orifice 50 and the bent portion 51 in the first flushing hole 12a is reduced. Therefore, the occurrence of the pulsation of the flushing flow rate flowing on the downstream of the orifice 50 in the flushing passage 12 is suppressed and it is possible to prevent the occurrence of the vibration of the pipe 75.

The flushing flow rate is adjusted by detaching the plug 85 from the cover portion 32, detaching the orifice plug 52 from the first flushing hole 12a through the opening portion 81, and installing an orifice plug 52 having an orifice 50 which has a different inner diameter in the first flushing hole 12a through the opening portion 81. In this way, it is possible to adjust the flushing flow rate by replacing the orifice 50 assembled into the cover portion 32. Therefore, it is possible to easily adjust the flushing flow rate.

In the present embodiment, the mode in which the orifice 50 is provided to be replaceable in the case 30 is described. In place of this, the orifice 50 may be directly formed in the case 30. That is, the orifice 50 may be provided to be non-replaceable in the case 30.

According to the above first embodiment, the following effects are obtained.

The cooling ability of the flushing circuit 10 is adjusted by the orifice 50. Since the bent portion 51 is formed on the downstream side of the orifice 50, the generation of the negative pressure on the downstream side of the orifice 50 is reduced. Therefore, it is possible to easily adjust the cooling ability of the flushing circuit 10, and it is possible to suppress the occurrence of the pulsation of the flushing flow rate.

Second Embodiment

Figure 5:
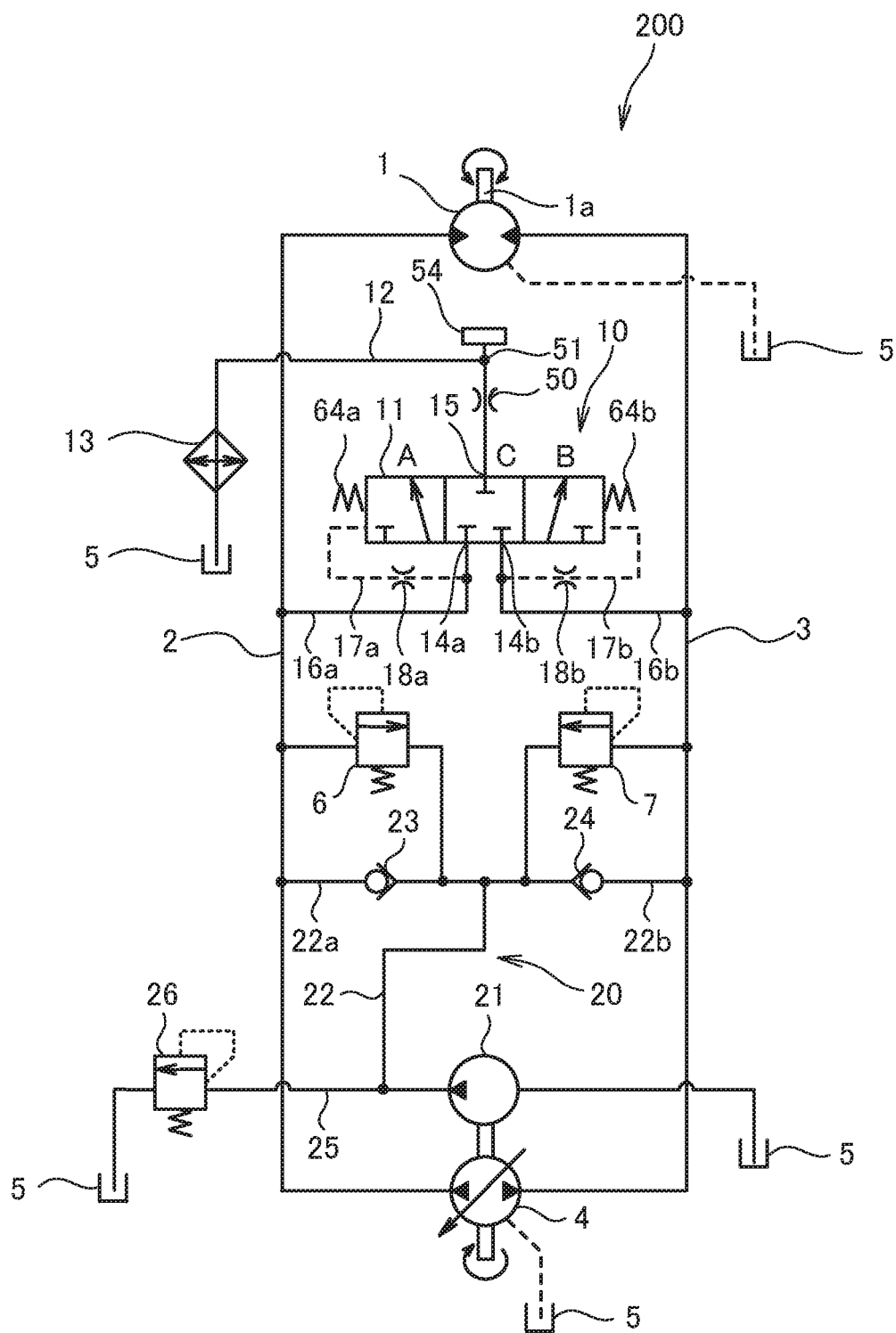
FIG. 5 is a fluid pressure circuit diagram of a fluid pressure drive device according to a second embodiment of the present invention.

Next, with reference to FIG. 5, a fluid pressure drive device 200 according to a second embodiment of the present invention will be described. FIG. 5 is a fluid pressure circuit diagram of the fluid pressure drive device 200. Hereinafter, a different point from the fluid pressure drive device 100 according to the above first embodiment will be described. The same configurations as the fluid pressure drive device 100 will be given the same reference signs and description thereof will be omitted.

The fluid pressure drive device 200 is different from the fluid pressure drive device 100 according to the above first embodiment in a point that a chamber 54 is provided on the downstream side of an orifice 50 in a flushing passage 12.

The chamber 54 is a space having the fixed volume, and flushing oil passing through the orifice 50 flows into the chamber 54. By providing the chamber 54 having the fixed volume on the downstream side of the orifice 50, a flow of the flushing oil passing through the orifice 50 is rectified. Thereby, it is possible to reduce generation of negative pressure on the downstream side of the orifice 50. Therefore, occurrence of pulsation of a flushing flow rate flowing on the downstream of the orifice 50 in the flushing passage 12 is suppressed and it is possible to prevent occurrence of vibration of a pipe 75.

Third Embodiment

Figure 6:
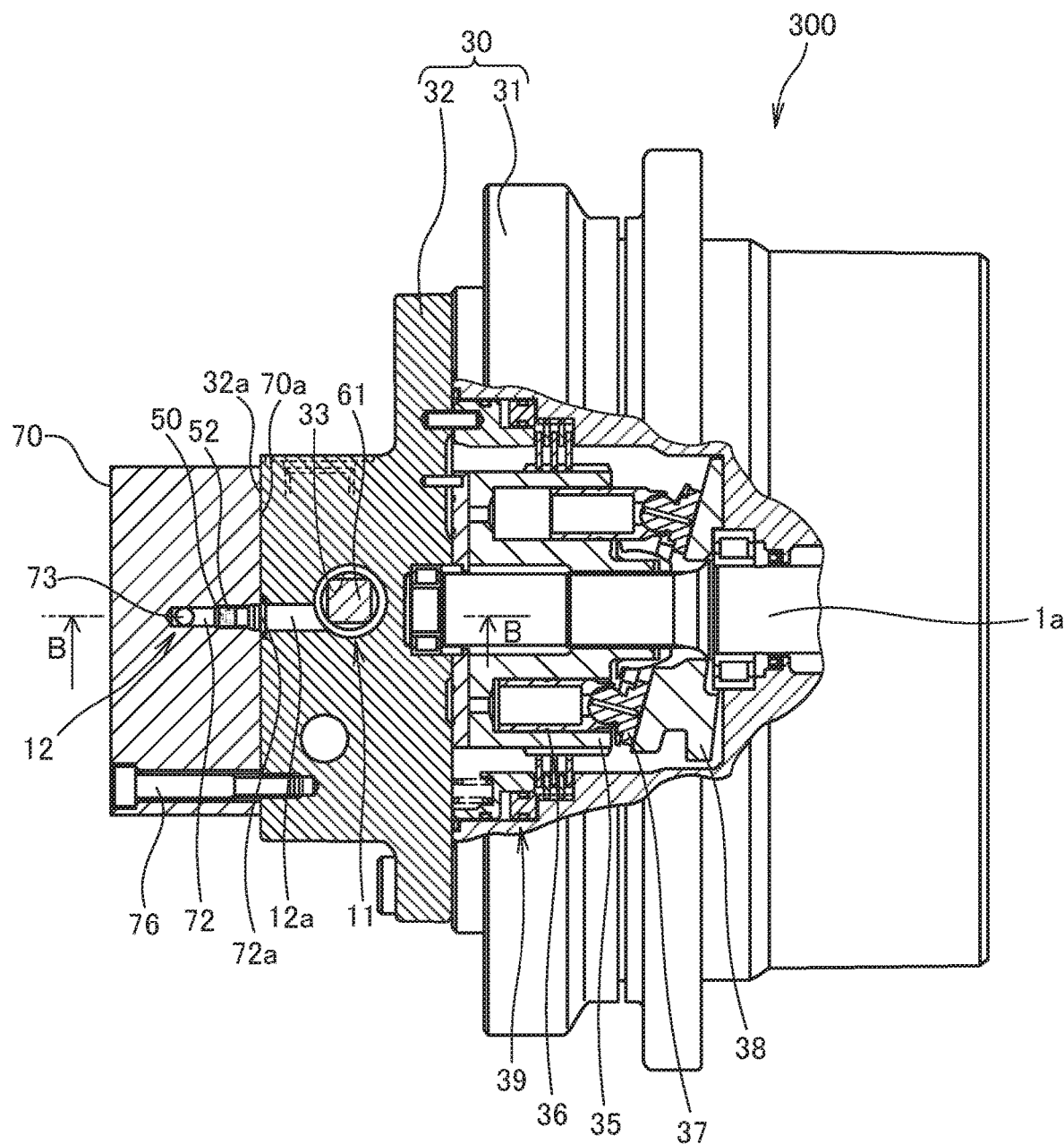
FIG. 6 is a sectional view of part of a fluid pressure drive device according to a third embodiment of the present invention.
Figure 7:
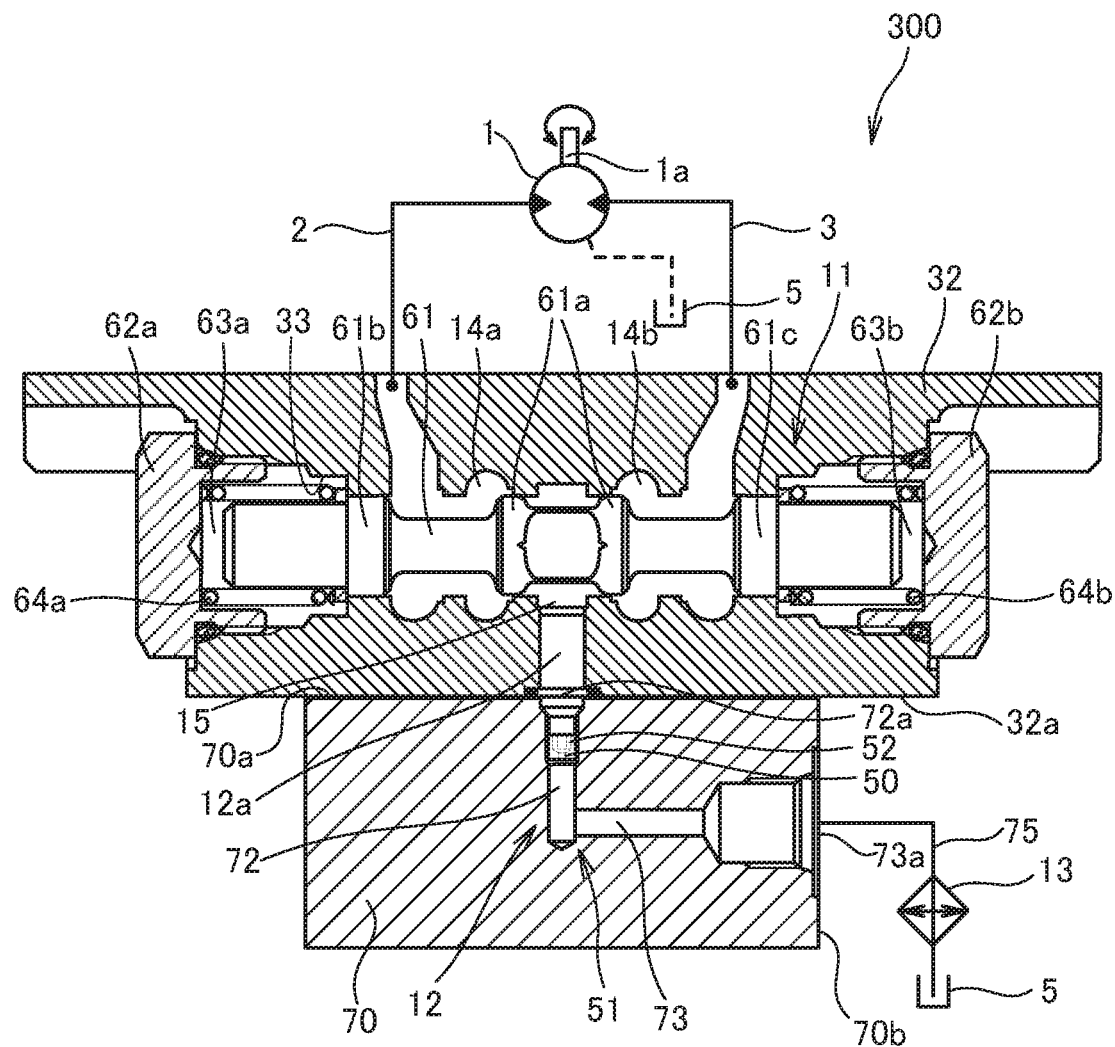
FIG. 7 is a sectional view taken along the line B-B of FIG. 6.

Next, with reference to FIGS. 6 and 7, a fluid pressure drive device 300 according to a third embodiment of the present invention will be described. FIG. 6 is a sectional view of part of the fluid pressure drive device 300, and FIG. 7 is a sectional view taken along the line B-B of FIG. 6. Hereinafter, a different point from the fluid pressure drive device 100 according to the above first embodiment will be described. The same configurations as the fluid pressure drive device 100 will be given the same reference signs and description thereof will be omitted.

The fluid pressure drive device 300 is different from the fluid pressure drive device 100 according to the above first embodiment in a point that an orifice 50 and a bent portion 51 are assembled into a flow rate adjusting block 70 which is a body separate from a case 30. Hereinafter, details will be described.

The flow rate adjusting block 70 is fixed to a side surface 32a of a cover portion 32 in the case 30 by plural bolts 76. In this way, the flow rate adjusting block 70 is detachably fixed to the case 30.

A second flushing hole 72 and a third flushing hole 73 are formed in the flow rate adjusting block 70. The second flushing hole 72 has an opening portion 72a on a surface 70a in contact with the side surface 32a of the cover portion 32. The second flushing hole 72 communicates with a first flushing hole 12a formed in the cover portion 32. The third flushing hole 73 has an opening portion 73a on a surface 70b which is different from the surface 70a. The first flushing hole 12a and the second flushing hole 72 communicate with each other in a linear shape. A pipe 75 communicating with a tank 5 is connected to the opening portion 73a of the third flushing hole 73. A flushing passage 12 is formed by the first flushing hole 12a, the second flushing hole 72, the third flushing hole 73, and the pipe 75.

The second flushing hole 72 and the third flushing hole 73 are formed in a linear shape, and end portions of the second and third flushing holes 72 and 73 communicate with each other while being orthogonal to each other. A communication portion between the second flushing hole 72 and the third flushing hole 73 is the bent portion 51.

The orifice 50 is provided in the second flushing hole 72. Specifically, the orifice 50 is formed in an orifice plug 52 screwed and fixed to an inner periphery of the second flushing hole 72. In this way, the orifice 50 and the bent portion 51 are assembled into the flow rate adjusting block 70 which is a body separate from the case 30 in which a hydraulic motor 1 and a low pressure selection valve 11 are accommodated.

A flushing flow rate is adjusted by detaching the flow rate adjusting block 70 from the cover portion 32, detaching the orifice plug 52 from the second flushing hole 72 through the opening portion 72a, and installing an orifice plug 52 having an orifice 50 which has a different inner diameter in the second flushing hole 72 through the opening portion 72a. In this way, it is possible to adjust the flushing flow rate by detaching the flow rate adjusting block 70 from the cover portion 32 and replacing the orifice 50 assembled into the flow rate adjusting block 70. Therefore, it is possible to easily adjust the flushing flow rate.

The orifice 50 is assembled into the flow rate adjusting block 70 detachably fixed to the case 30. Thus, a change is more easily made from the type in which the flushing flow rate is adjusted by the relief valve 40 as shown in the comparative example shown in FIG. 4 to the type in which the flushing flow rate is adjusted by the orifice 50. That is, selection is more easily made between the flow rate adjusting block 70 into which the orifice 50 is assembled and a flow rate adjusting block into which the relief valve 40 is assembled.

Fourth Embodiment

Figure 8:
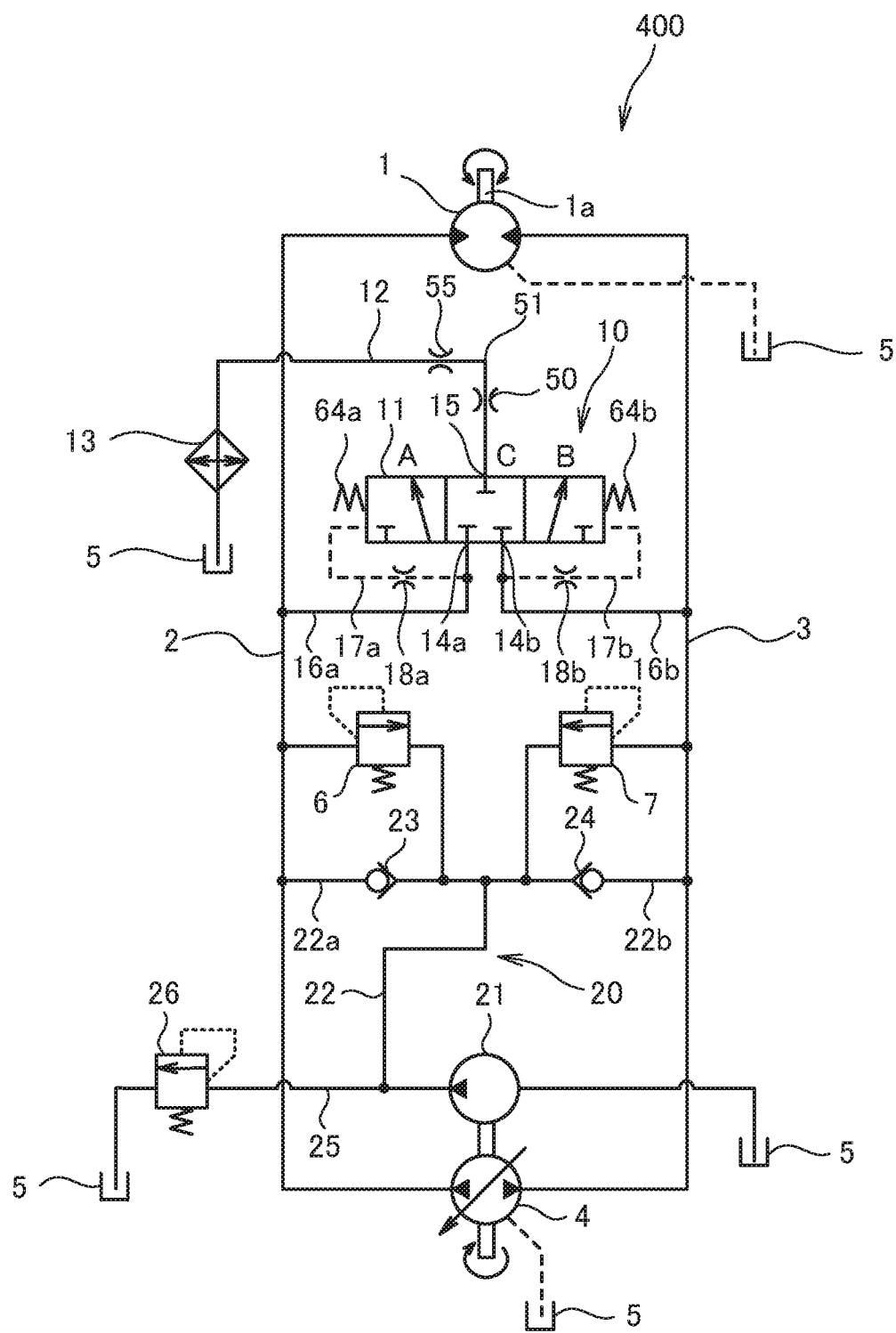
FIG. 8 is a fluid pressure circuit diagram of a fluid pressure drive device according to a fourth embodiment of the present invention.
Figure 9:
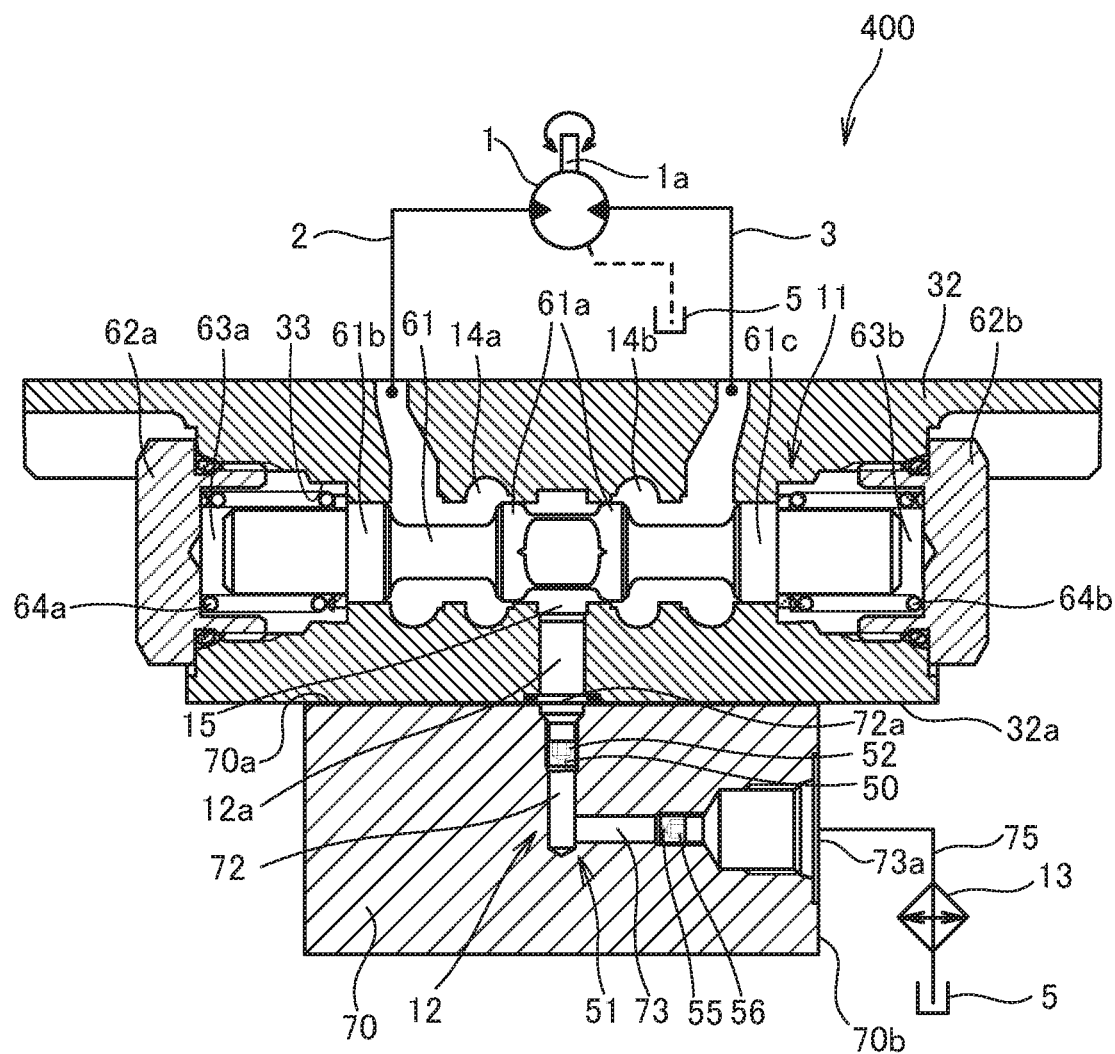
FIG. 9 is a sectional view of part of the fluid pressure drive device according to the fourth embodiment of the present invention, the view corresponding to FIG. 3.

Next, with reference to FIGS. 8 and 9, a fluid pressure drive device 400 according to a fourth embodiment of the present invention will be described. FIG. 8 is a fluid pressure circuit diagram of the fluid pressure drive device 400, and FIG. 9 is a sectional view of part of the fluid pressure drive device 400. Hereinafter, a different point from the fluid pressure drive devices 100, 300 according to the above first and third embodiments will be described. The same configurations as the fluid pressure drive devices 100, 300 will be given the same reference signs and description thereof will be omitted.

In the fluid pressure drive device 400, a flushing passage 12 has a first orifice 50 provided to be replaceable and a bent portion 51 formed on the downstream side of the first orifice 50, and in addition, a second orifice 55 provided to be replaceable on the downstream side of the bent portion 51.

As shown in FIG. 9, the second orifice 55 is provided in a third flushing hole 73. Specifically, the second orifice 55 is formed in an orifice plug 56 screwed and fixed to an inner periphery of the third flushing hole 73. The orifice plug 56 is attached to and detached from the third flushing hole 73 through an opening portion 73a.

Since the second orifice 55 is provided on the downstream side of the first orifice 50, a pressure decrease between the first orifice 50 and the second orifice 55 is suppressed by a pressure loss in the second orifice 55. As well as the chamber 54 of the fluid pressure drive device 200 according to the above second embodiment, the second orifice 55 has an operation of rectifying a flow of flushing oil passing through the first orifice 50. Thereby, it is possible to more effectively reduce generation of negative pressure on the downstream side of the first orifice 50. Therefore, occurrence of pulsation of a flushing flow rate flowing on the downstream of the orifice 50 in the flushing passage 12 is suppressed and it is possible to prevent occurrence of vibration of a pipe 75.

An opening area of the first orifice 50 is preferably smaller than an opening area of the second orifice 55. This is because the first orifice 50 has a function of adjusting the flushing flow rate while the second orifice 55 has a function of rectifying the flow of the flushing oil, and hence the opening area of the second orifice 55 does not have to be small. Therefore, the flushing flow rate is adjusted mainly by replacing the first orifice 50.

Both the second orifice 55 and the chamber 54 described in the above second embodiment may be provided in the flushing passage 12. In that case, the second orifice 55 is preferably provided on the downstream side of the chamber 54.

Hereinafter, the configurations, the operations, and the effects of the embodiments of the present invention will be summed up and described.

The fluid pressure drive device 100, 200, 300, 400 includes the hydraulic motor (fluid pressure motor) 1 configured to be driven by the working fluid which is supplied from the hydraulic pump (fluid pressure pump) 4, the pair of main passages 2, 3 connected to the hydraulic motor 1, one of the main passages to which the working oil (working fluid) supplied from the hydraulic pump 4 is led, and the flushing circuit 10 configured to discharge the working oil from one of the pair of main passages 2, 3 to the tank 5. The flushing circuit 10 has the low pressure selection valve 11 provided between the pair of main passages 2, 3 and configured to be switched by the pressure difference between the pair of main passages 2, 3, the low pressure selection valve being configured to select the main passage on the low pressure side, and the flushing passage 12 configured to lead the working oil passing through the low pressure selection valve 11 to the tank 5, and the flushing passage 12 has the first orifice 50 and the bent portion 51 formed on the downstream side of the first orifice 50.

With this configuration, the cooling ability of the flushing circuit 10 is adjusted by the first orifice 50. Since the bent portion 51 is formed on the downstream side of the first orifice 50, the generation of the negative pressure on the downstream side of the first orifice 50 is reduced. Therefore, it is possible to easily adjust the cooling ability of the flushing circuit 10, and it is possible to suppress the occurrence of the pulsation of the flushing flow rate.

The chamber 54 is provided in the flushing passage 12 on the downstream side of the first orifice 50.

With this configuration, the flow of the flushing oil passing through the first orifice 50 is rectified by the chamber 54. Thus, it is possible to reduce the generation of the negative pressure on the downstream side of the first orifice, and it is possible to suppress the occurrence of the pulsation of the flushing flow rate.

The flushing passage 12 further has the second orifice 55 provided on the downstream side of the bent portion 51.

With this configuration, the second orifice 55 is provided on the downstream side of the first orifice 50. Thus, it is possible to more effectively reduce the generation of the negative pressure on the downstream side of the first orifice 50, and it is possible to suppress the occurrence of the pulsation of the flushing flow rate.

The opening area of the first orifice 50 is smaller than the opening area of the second orifice 55.

With this configuration, the first orifice 50 has the function of adjusting the flushing flow rate while the second orifice 55 has the function of rectifying the flow of the flushing fluid.

The fluid pressure drive device 300 further includes the case 30 in which the hydraulic motor 1 and the low pressure selection valve 11 are accommodated, and the flow rate adjusting block 70 detachably fixed to the case 30, the flow rate adjusting block into which the first orifice 50 and the bent portion 51 are assembled.

With this configuration, the first orifice 50 is assembled into the flow rate adjusting block 70 detachably fixed to the case 30. Thus, a change is more easily made from the type in which the flushing flow rate is adjusted by the relief valve 40 to the type in which the flushing flow rate is adjusted by the first orifice 50.

Embodiments of this invention were described above, but the above embodiments are merely examples of applications of this invention, and the technical scope of this invention is not limited to the specific constitutions of the above embodiments.

For example, in the above embodiments, the mode in which the working oil of the flushing circuit 10 is discharged to the tank 5 is described. In place of this, the working oil of the flushing circuit 10 may be led into the case 30 of the hydraulic motor 1 and then discharged to the tank 5. That is, the working oil of the flushing circuit 10 may be discharged to the tank 5 via the case 30 of the hydraulic motor 1.

This application claims priority based on Japanese Patent Application No. 2018-220609 filed with the Japan Patent Office on Nov. 26, 2018, the entire contents of which are incorporated into this specification.

The invention claimed is:

1. A fluid pressure drive device, comprising:
   a fluid pressure motor configured to be driven by a working fluid which is supplied from a fluid pressure pump;
   a pair of main passages connected to the fluid pressure motor, the working fluid from the fluid pressure pump flowing into one of the pair of the main passages; and
   a flushing circuit configured to discharge the working fluid from the other one of the pair of main passages to a tank, wherein
   the flushing circuit has:
      a low pressure selection valve provided between the pair of main passages and being configured to be switched by a pressure difference between the pair of main passages, to select the main passage at a low pressure side; and
      a flushing passage configured to lead the working fluid passing through the low pressure selection valve to the tank, and the flushing passage has:
a first orifice;
a bent portion formed at a downstream side of the first orifice; and
a second orifice provided at a downstream side of the bent portion and having a constant opening area.

2. The fluid pressure drive device according to claim 1, wherein a chamber is provided in the flushing passage at the downstream side of the first orifice.

3. The fluid pressure drive device according to claim 1, wherein an opening area of the first orifice is smaller than an opening area of the second orifice.

4. The fluid pressure drive device according to claim 1, wherein
the first orifice has a first opening for adjusting a flow rate of the working fluid flowing in the flushing passage, and
the second orifice has a second opening for rectifying the flow of the working fluid, the second opening being greater than the first opening.

5. A fluid pressure drive device, comprising:
a fluid pressure motor configured to be driven by a working fluid which is supplied from a fluid pressure pump;
a pair of main passages connected to the fluid pressure motor, the working fluid from the fluid pressure pump flowing into one of the pair of the main passages;
a flushing circuit configured to discharge the working fluid from the other one of the pair of main passages to a tank, the flushing circuit including:
a low pressure selection valve provided between the pair of main passages and being configured to be switched by a pressure difference between the pair of main passages to select the main passage at a low pressure side; and
a flushing passage, including a first orifice and a bent portion formed at a downstream side of the first orifice, and being configured to lead the working fluid passing through the low pressure selection valve to the tank;
a case in which the fluid pressure motor and the low pressure selection valve are accommodated; and
a flow rate adjusting block detachably fixed to the case and including the first orifice and the bent portion.

* * * * *